June 19, 1923.
E. C. HUTCHINSON
RUNNER CONSTRUCTION FOR PELTON WHEELS
Filed April 17, 1922  2 Sheets-Sheet 2
1,459,672
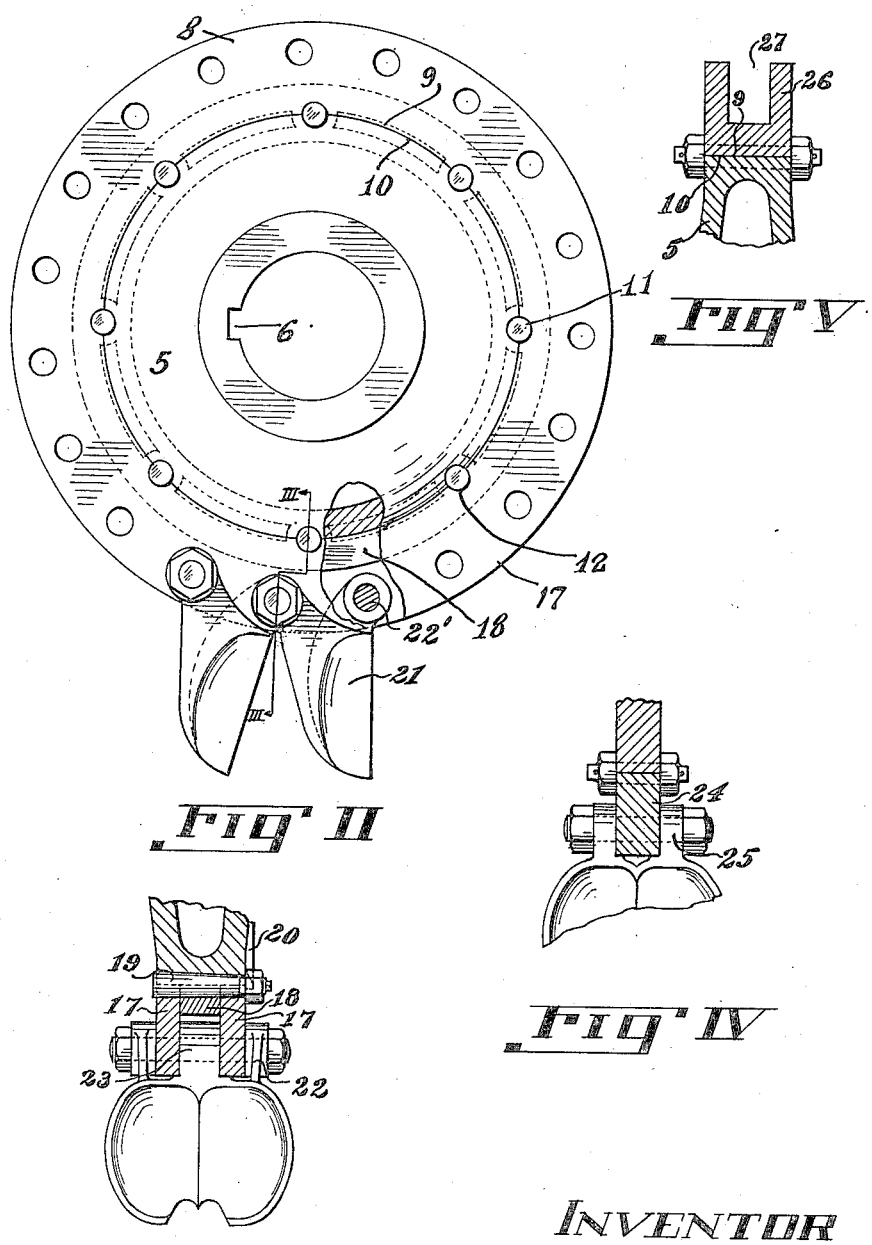
INVENTOR
ELY C. HUTCHINSON Patented June 19, 1923.

1,459,672

UNITED STATES PATENT OFFICE.

ELY C. HUTCHINSON, OF OAKLAND, CALIFORNIA, ASSIGNOR TO PELTON WATER WHEEL CO., OF SAN FRANCISCO, CALIFORNIA, A CORPORATION OF CALIFORNIA.

RUNNER CONSTRUCTION FOR PELTON WHEELS.

Application filed April 17, 1922. Serial No. 553,525.

*To all whom it may concern:*

Be it known that I, ELY C. HUTCHINSON, a citizen of the United States, residing at Oakland, in the county of Alameda and State of California, have invented certain new and useful Improvements in Runner Constructions for Pelton Wheels, of which the following is a specification.

In hydraulic constructions and installations it has become the practice to build single units of enormous size, that is a developed horse power capacity of a single unit or generator is far greater now than in the past, and to maintain the required output for the station, these generators are required to operate continuously.

A serious problem confronting the users of water wheel driven generators is the serious loss of power output to the generating system from forced shut-downs from any cause.

In all water wheel installations, the buckets in time require repairing or replacement and in some cases require adjustment on the wheel as the mounting members become loose, occasioned by wear, and the present invention has for its principal object to accomplish such adjustment or replacement or complete renewal of the buckets with a minimum shut-down of the generator.

The present invention by accomplishing this object materially reduces the loss of power output over installations requiring the repairing of the buckets on the wheel or the removal of the wheel from the generator shaft.

My present invention consists in removably mounting the buckets on a rim or ring which is adapted to be detachably secured to a hub, core or wheel center, preferably fixed to the generator shaft, the parts being held together by bolts or other means, and there being provided a removable portion or side wall for the wheel housing through which the rim with its buckets is adapted for removal from the hub for replacement by another.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 2 is a view in side elevation, partly in broken section, illustrating the preferred embodiment of the wheel center and bucket ring construction.

Fig. 3 is a sectional view on line 3—3 of Fig. 2.

Fig. 4 is a view of a modified form of center and bucket ring construction.

Fig. 5 is a further modified form.

Figure 1:
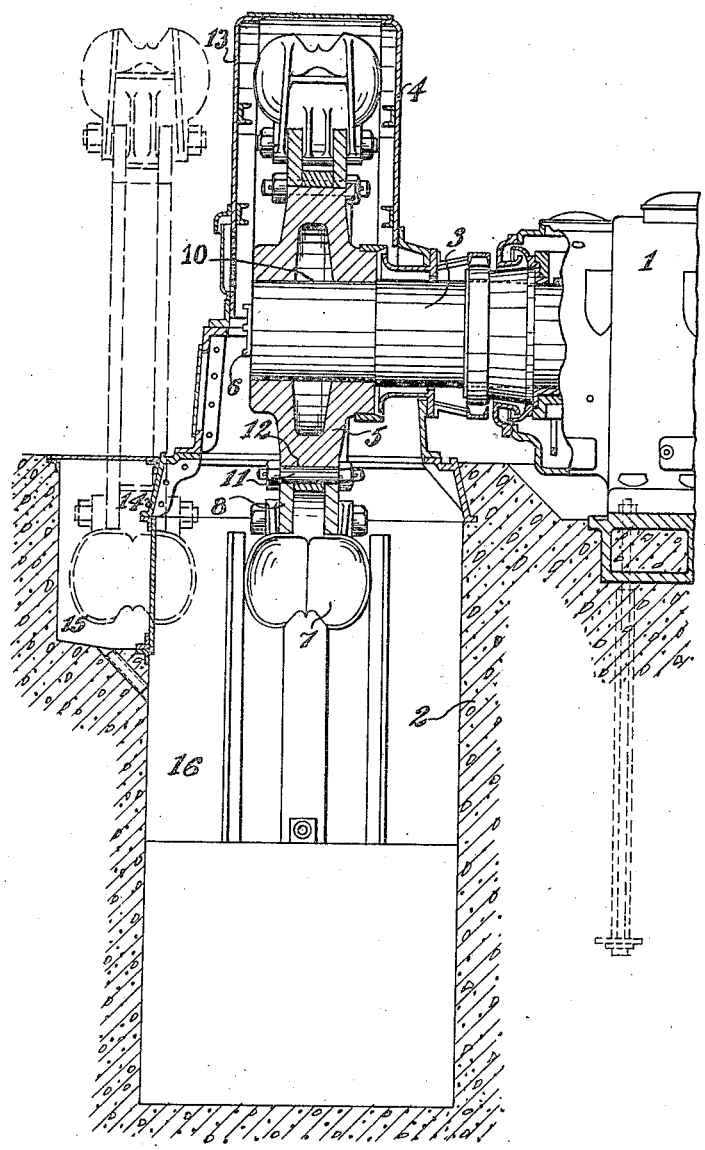
Fig. 1 is a view in vertical section of a power generator disclosing a portion of the generator unit, the shaft, the wheel and the wheel housing, illustrating in dotted lines the bucket mounting ring removed from the wheel center.

Referring more particularly to the drawings, wherein like characters of reference designate corresponding parts, 1 indicates a shaft bearing of any suitable type mounted on a base 2. The generator shaft 3 extends into the conventional wheel housing 4 and therein mounts a wheel center 5, preferably keyed to the shaft, as at 6.

A plurality of buckets 7 of the well known type are disposed about the periphery of a bucket ring 8 and extend in the conventional manner radially therefrom, as in the drawings. The ring, of any suitable type, has an inner diameter 9 to fit the outer periphery 10 of the center 5, and the two are detachably held together in any manner, preferably by suitable bolts 11 passing transversely of the center through recesses formed in the co-operating peripheries of the center and ring, illustrated as at 12.

To enable the removal of the ring from the housing without entirely demounting the housing or removing the shaft 3, one side wall 13 and one side of the housing mounting frame 14 is adapted to be removed and a shallow pit 15 is provided at the outer side of the main pit 16.

The preferred bucket ring construction, illustrated in Figs. 2 and 3, comprises the side ring member 17 and the center or spacing ring member 18 held in position on the periphery of the center by the tapered bolts 19. One of the rings 17 is in contact with limiting lugs 20 formed on one face of the center. In this construction, the buckets 21 are of a particular design and are provided with spaced aligned ears 22 for securing to the ring at one portion by bolts 22', and a single central ear 23 for securing between the rings 17 at a point in line with the attachment of the spaced ears of the adjacent buckets.

In Fig. 4 a plain bucket ring 24 is illustrated and the same mounts the double eared buckets 25, and in Fig. 5, I have illustrated a channeled ring 26, the channel 27 of which is adapted for reception of the single ears of the conventional buckets, or the double ears, shown in Figs. 2 and 3.

It will be observed that in repairing or replacing the buckets, that it is only necessary to remove the center and ring uniting bolts, remove the ring and buckets through the opening afforded by the removable end of the frame 14, and suitable removal of housing 4, then position on the same center a bucket ring and buckets which may be accomplished in a very short time, requiring but a comparatively short shut-down of the generator.

It will be observed that in the present construction, the bolts for securing the bucket ring to the center afford a means for transmitting the full power developed by the buckets to the shaft, although this form of structure may be varied to suit the desired requirement.

I claim:—

1. A water wheel comprising a two part structure consisting of a center for securing to a shaft, and a bucket carrying ring removably mounted on the periphery thereof, means for detachably securing the parts together, and a plurality of buckets carried by the ring, said ring mounting the buckets adapted for removal with the buckets as a unit from the center.

2. A water wheel comprising a two part structure, consisting of a center for securing to a shaft and a bucket carrying ring removably mounted thereon with its inner periphery fitting the outer periphery of the center, one of said parts provided with a limiting lug against which the other is adapted to abut when in co-operative relation, a plurality of bolts passing transversely through the parts at their point of contact, and a plurality of buckets carried by the ring and removable therewith as a unit from said center.

3. A water wheel comprising a center for securing to a shaft, a bucket ring removably mounted on said center with its inner periphery fitting the outer periphery of the center, means passing transversely through the center and ring at their point of contact for detachably securing the ring to the center, and a plurality of buckets carried by said ring and removable from said center as a unit therewith.

4. The combination with a water wheel runner comprising a wheel center, a bucket ring and buckets secured thereto removably mounted on said center, a shaft to which said center is fixed, and a water wheel housing formed with a removable portion affording an opening for the passage therethrough of said ring and buckets when removed as a unit from said shaft.

5. In combination, a rotatable power unit shaft, an impulse water wheel mounted thereon and comprising a center, a bucket carrying rim detachably secured to the center, a casing enclosing the wheel, said casing provided with a removable portion through which said bucket mounting rim may pass when removed from the hub.

6. In combination, a rotatable power unit shaft, an impulse water wheel mounted thereon and comprising a center normally secured to the shaft, a rim removably carried by the center, a plurality of buckets carried by the rim and removable as a unit therewith, means for securing the rim to the center, a casing enclosing the wheel and within which the same rotates, said casing provided with a removable side wall through which said rim is adapted to pass when detached from said center.

In testimony whereof I have signed my name to this specification.

ELY C. HUTCHINSON.